Feb. 14, 1967  H. S. BURT  3,303,916
AUTOMATIC LOADING AND CONVEYOR APPARATUS
Filed Dec. 30, 1964  9 Sheets-Sheet 1
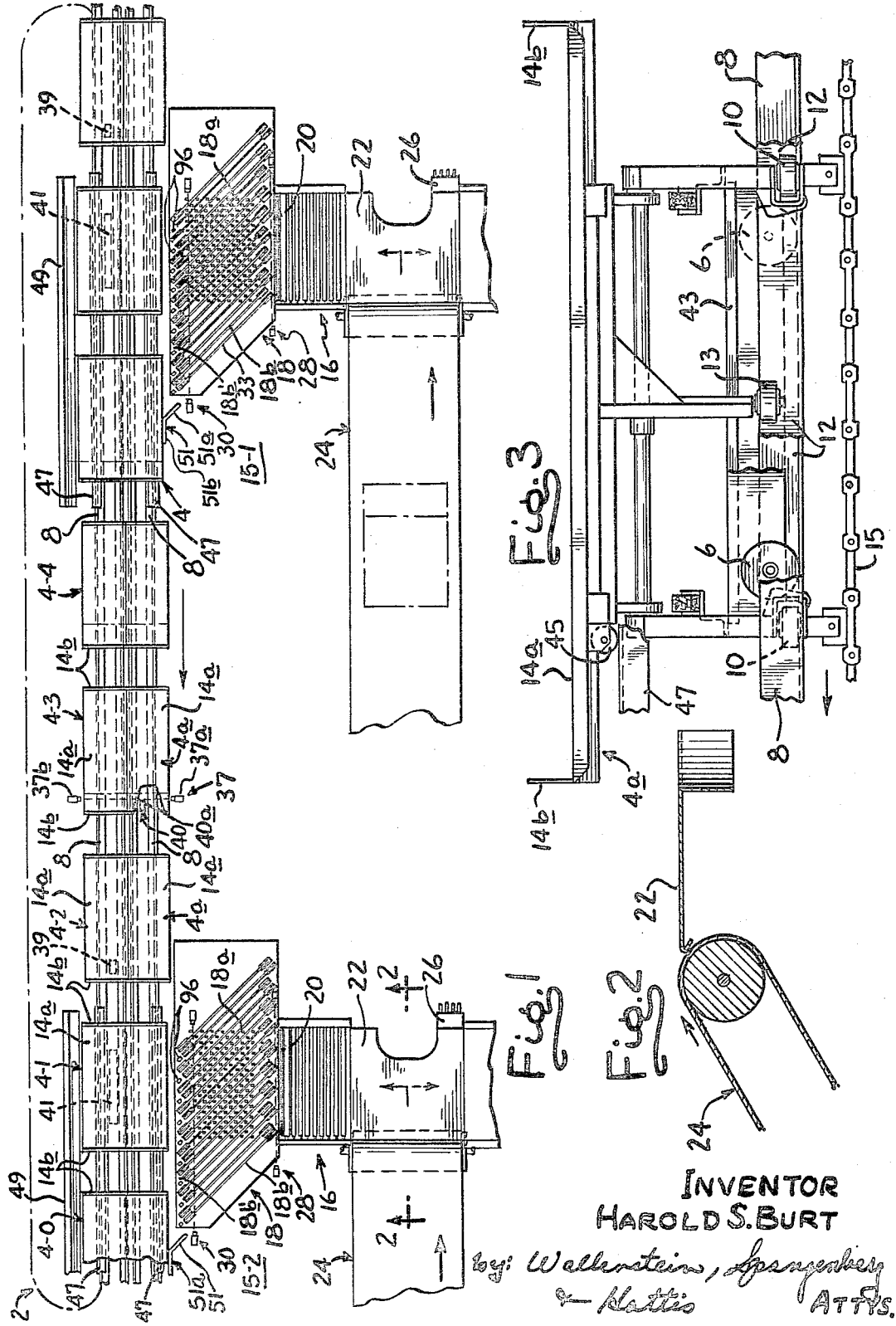
INVENTOR
HAROLD S. BURT
by: Wallenstein, Spangenberg
& Hattis
ATTYS.

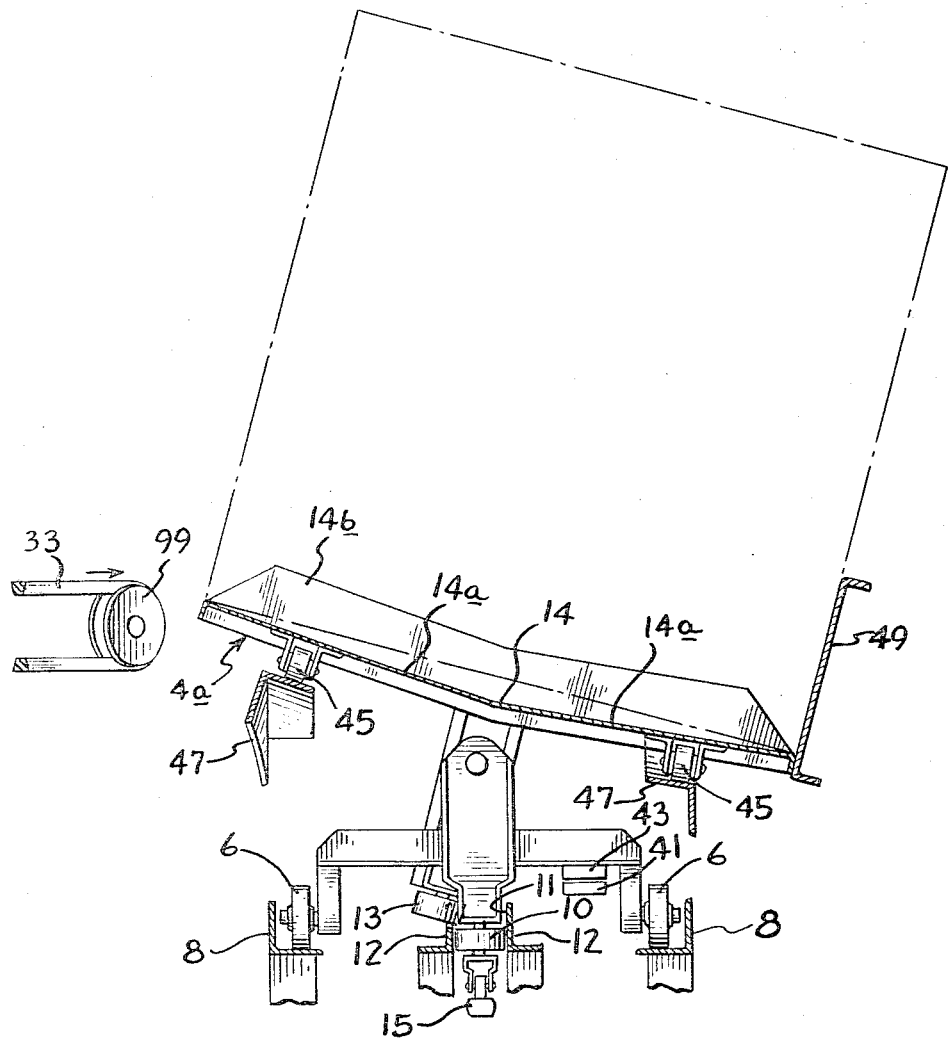

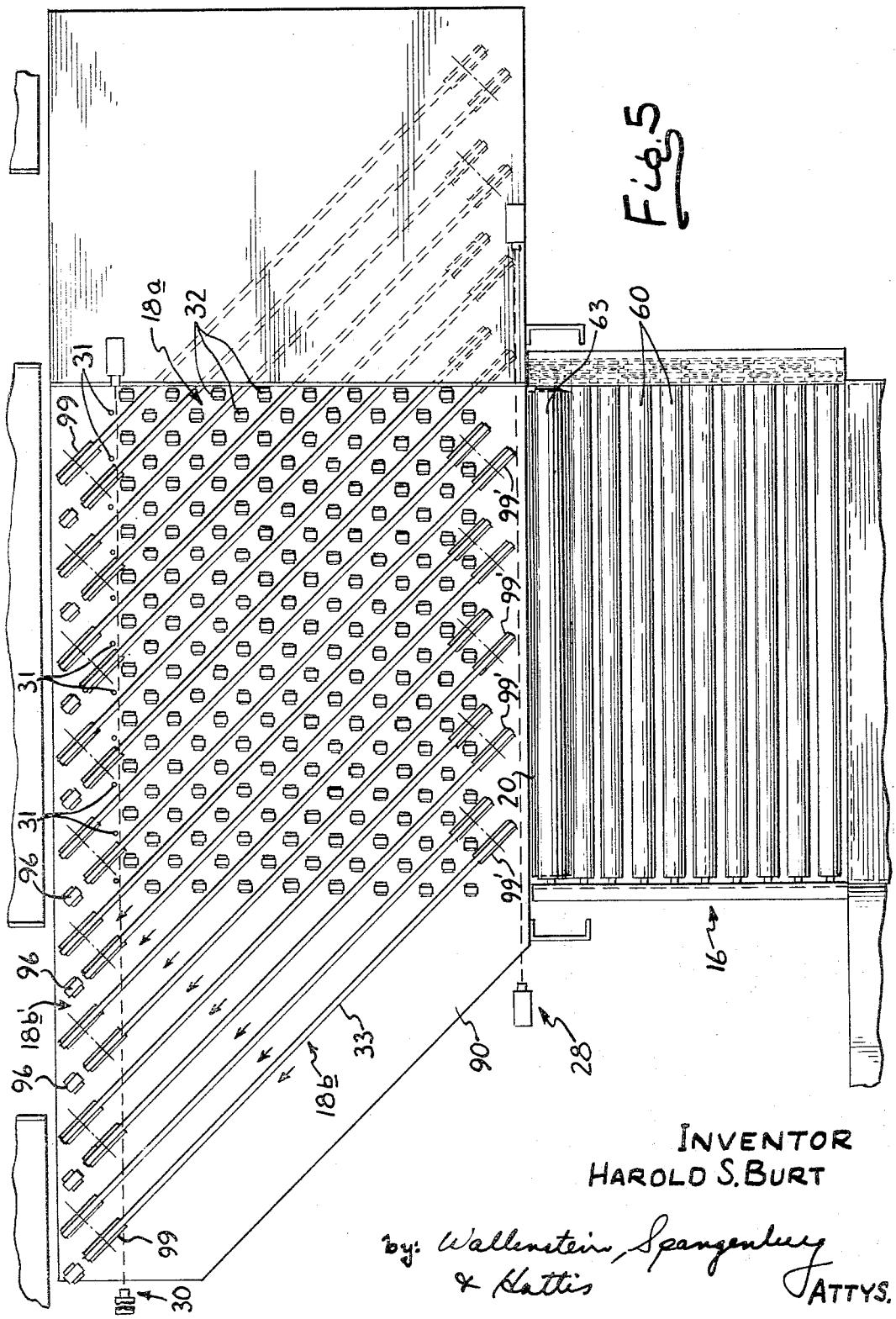

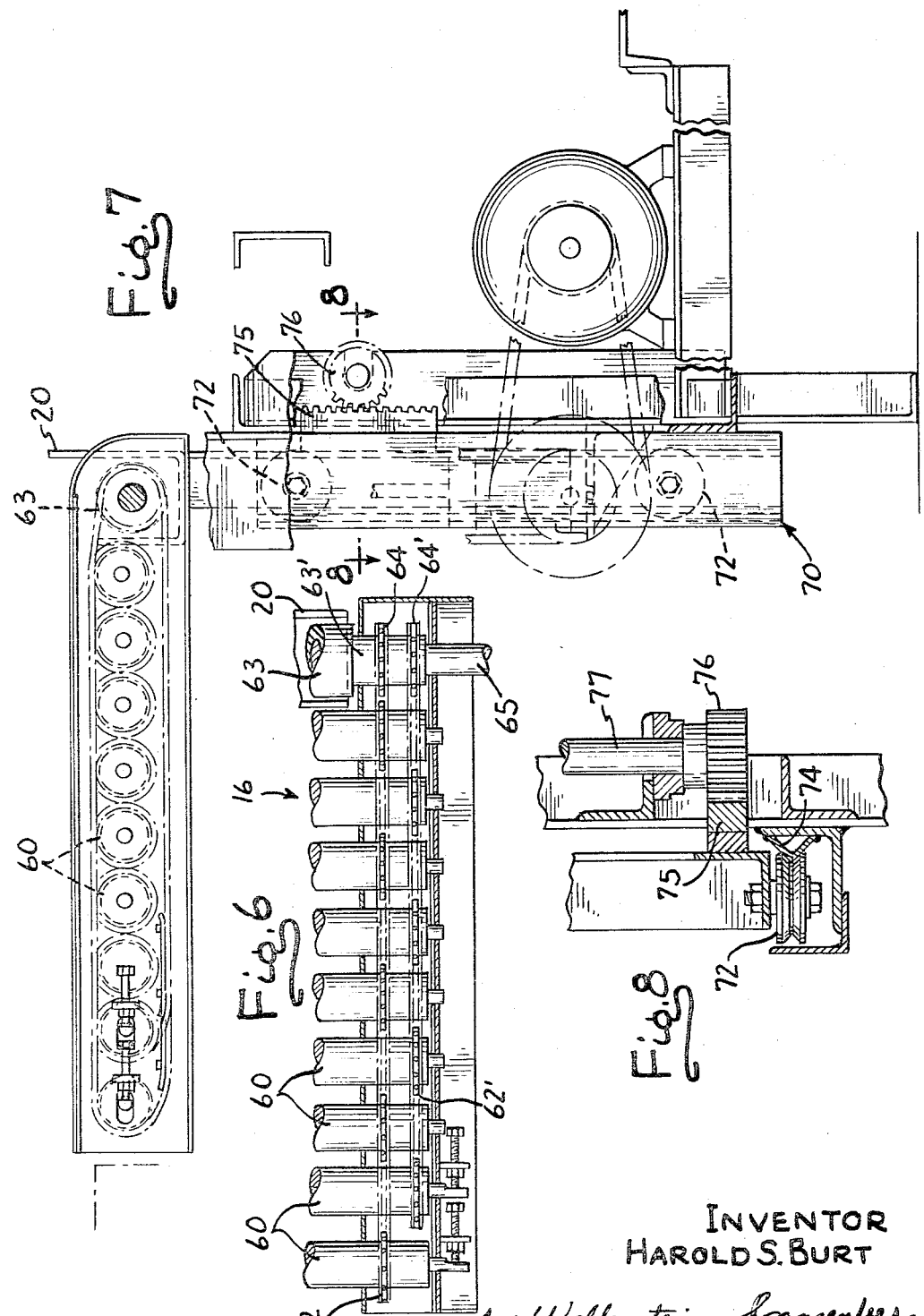

Feb. 14, 1967 H. S. BURT 3,303,916
AUTOMATIC LOADING AND CONVEYOR APPARATUS
Filed Dec. 30, 1964 9 Sheets-Sheet 5
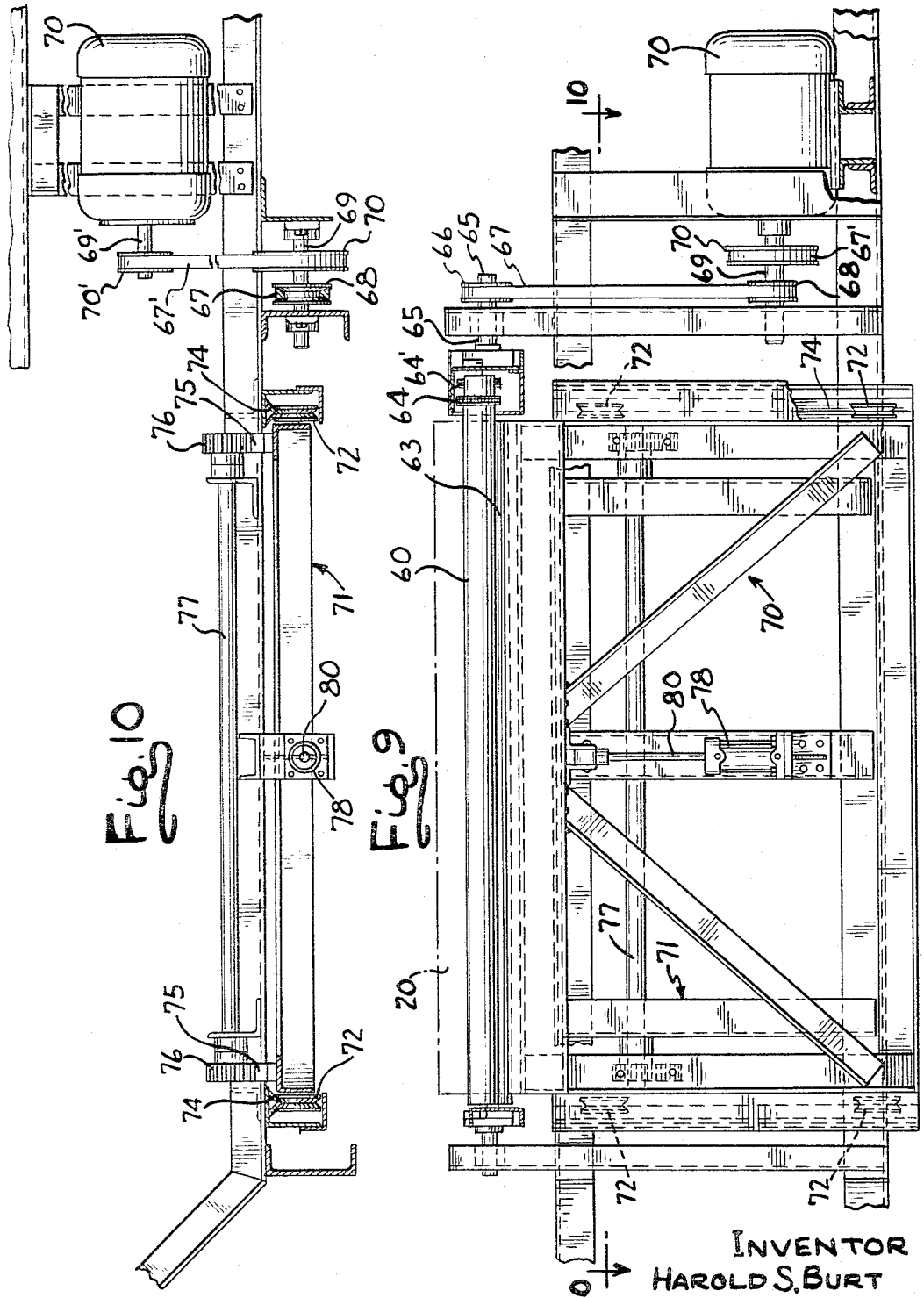
INVENTOR
HAROLD S. BURT
by: Wallenstein, Spangenberg
& Hattis
ATTYS.

Feb. 14, 1967          H. S. BURT          3,303,916
AUTOMATIC LOADING AND CONVEYOR APPARATUS
Filed Dec. 30, 1964                    9 Sheets-Sheet 6
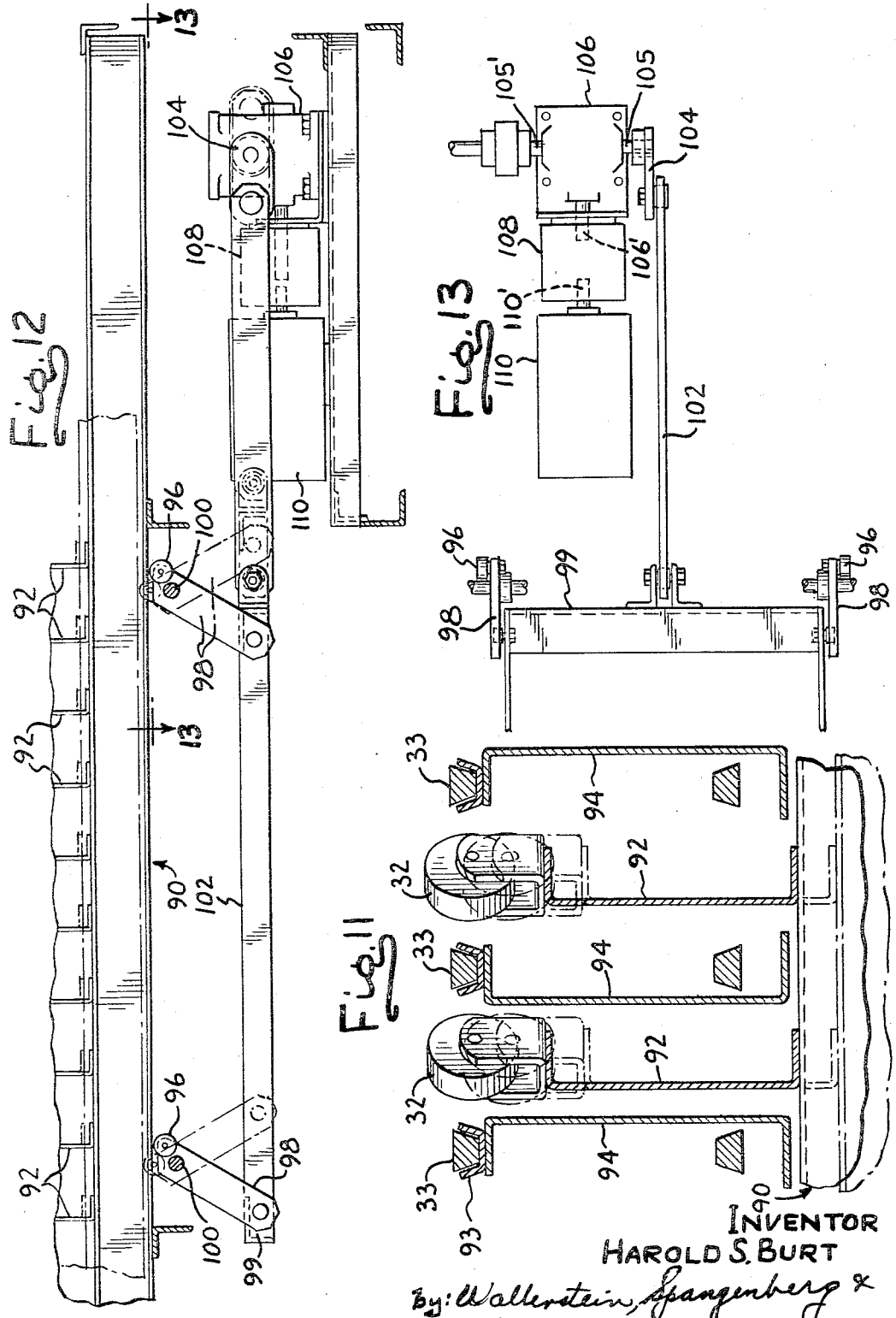

Feb. 14, 1967     H. S. BURT     3,303,916
AUTOMATIC LOADING AND CONVEYOR APPARATUS
Filed Dec. 30, 1964     9 Sheets-Sheet 7
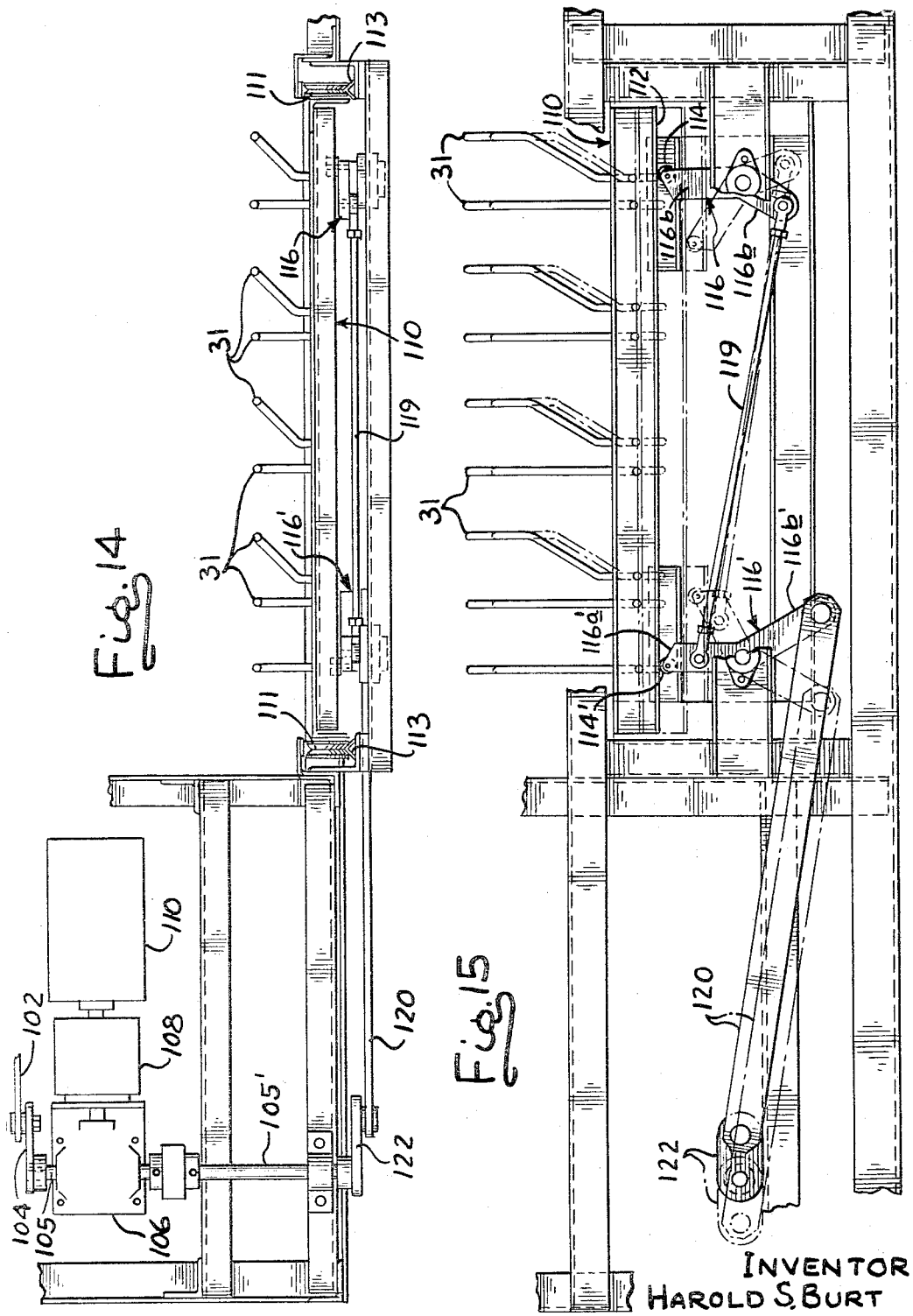
INVENTOR
HAROLD S. BURT
by: Wallenstein, Spangenberg
& Hattis
ATTYS.

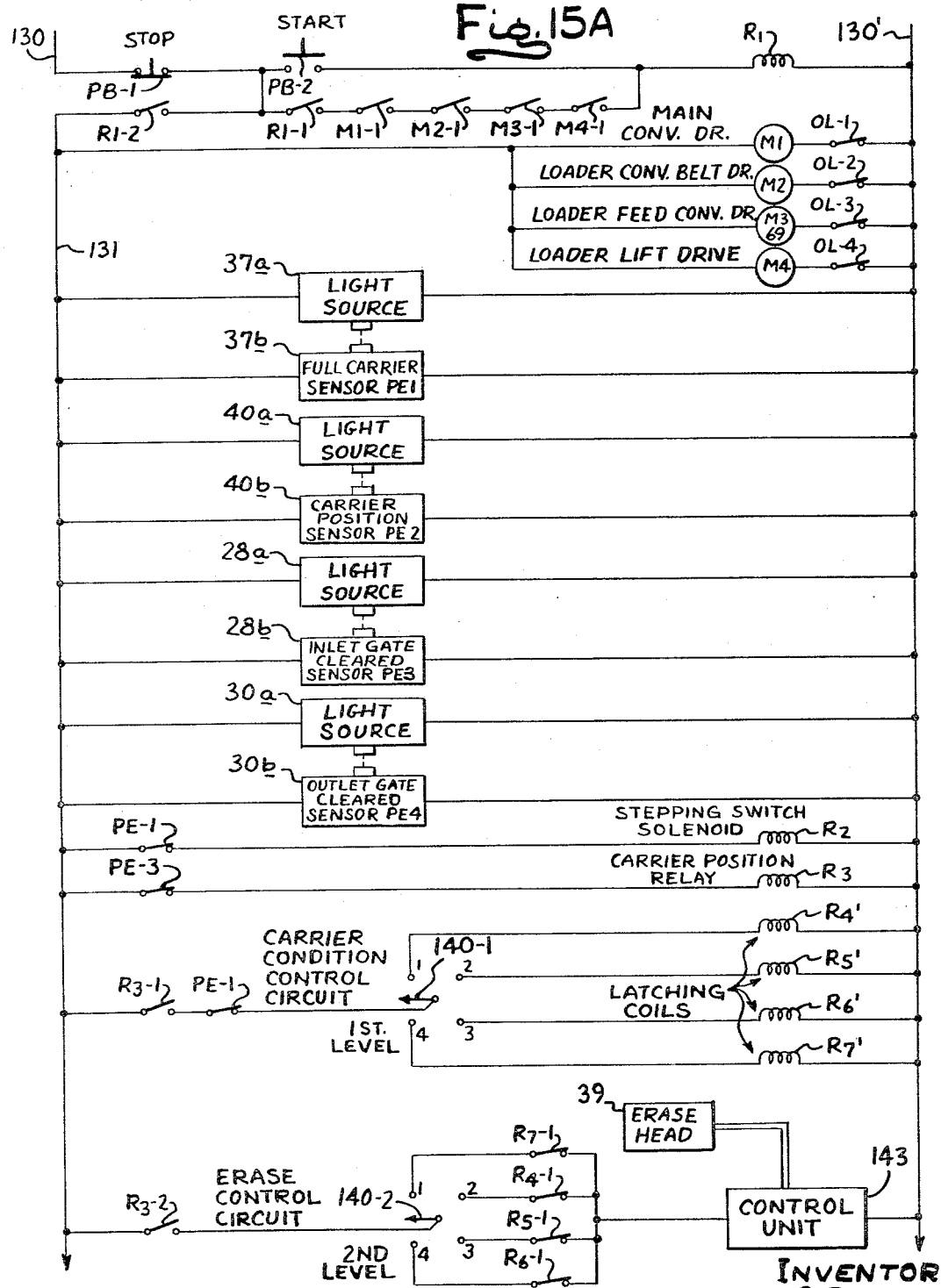

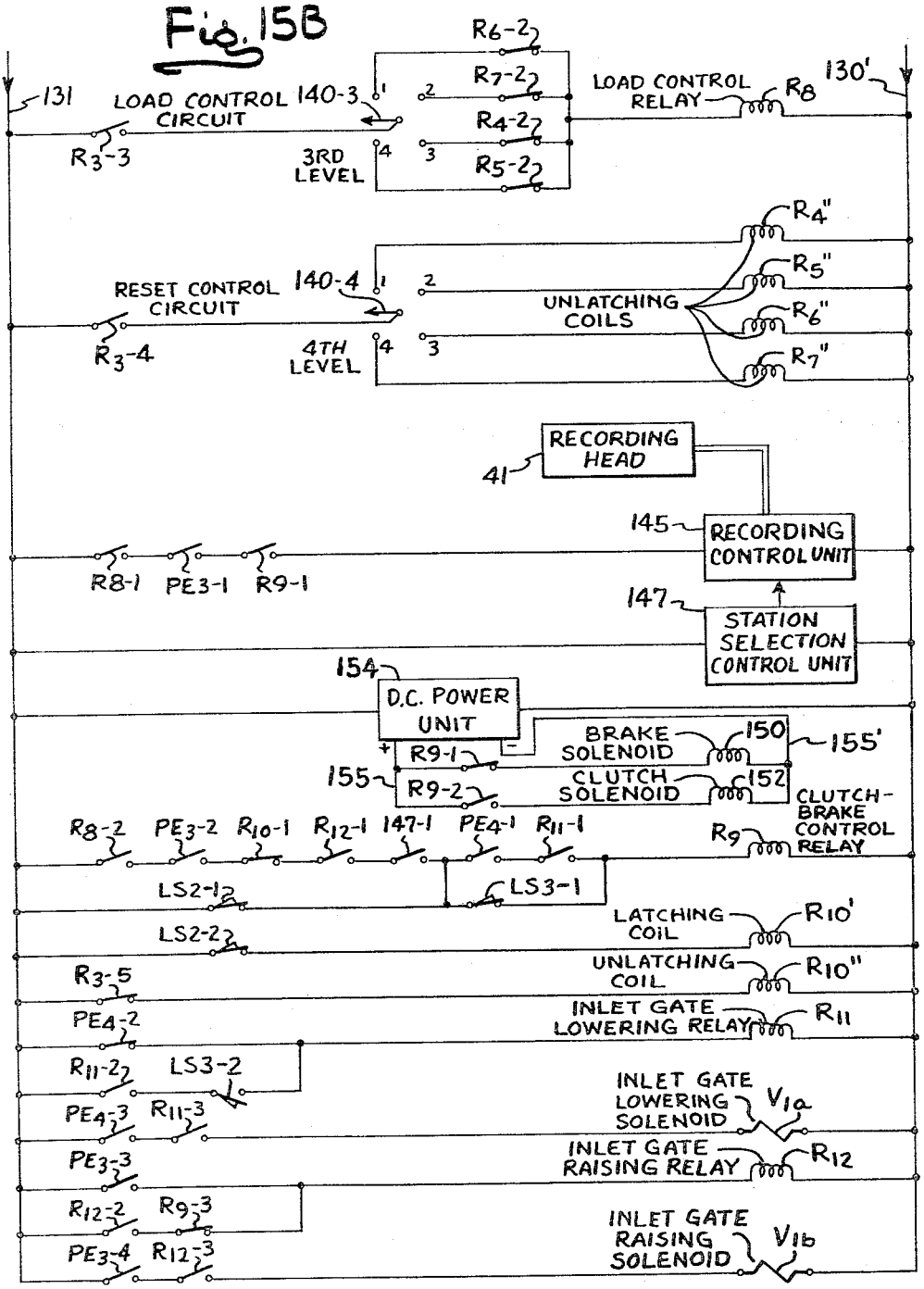

United States Patent Office 3,303,916
Patented Feb. 14, 1967

3,303,916
AUTOMATIC LOADING AND CONVEYOR APPARATUS
Harold S. Burt, Wilmette, Ill., assignor to Conveyor Systems, Inc., Morton Grove, Ill., a corporation of Illinois
Filed Dec. 30, 1964, Ser. No. 422,192
8 Claims. (Cl. 198—38)

The present invention relates to automatic loading and conveyor equipment and has its most important application where articles are to be loaded onto individual carrier units which are moved continuously in an endless path past one or more loading and discharge stations. In such case, the problem often exists in loading the articles, which may be boxes containing fragile articles, onto the carrier units with minimum shock and with equipment which is reliable and fast acting, so that maximum speed of the carrier units can be utilized.

The present invention also deals with the problem of loading articles automatically onto continuously moving carrier units moving along an endless path where some of the carrier units approaching a loading station already have articles thereon, and wherein it is desirable that the loading equipment be selectively operative to load articles only onto empty carrier units. This problem arises, for example, in a continuously moving conveyor system where the carrier units are loaded from two loading stations because the loading equipment cannot effect loading of the carrier unit fast enough from one loading station. In such case, both loaded and unloaded carrier units would be moved past the second loading station. The same problem also arises where, to avoid a jam-up of articles at a discharge station, the conveyor system is designed to discharge articles thereat only when the discharge station can accommodate such articles. In the event that a carrier unit cannot be discharged at the discharge station, one or more loaded carrier units would be recirculated by the conveyor system past the one or more loading stations involved.

It is, accordingly, one of the objects of the present invention to provide a loading and conveyor system comprising a series of carrier units which continuously pass one or more loading and discharge stations and improved automatic loading apparatus which can automatically load large or small articles onto the carrier units moving past a given loading station with minimum shock applied to the articles involved.

A further object of the present invention is to provide a loading and conveyor system with the associated loading apparatus as above described wherein the loading apparatus is automatically nonresponsive to the passage thereby of a loaded carrier unit and responsive to the passage thereby of an unloaded carrier unit by moving an article onto the same.

A still further object of the present invention is to provide a conveyor system with loading apparatus as described which is exceedingly reliable and quick acting so that articles can be moved onto a fast moving carrier unit.

Another object of the present invention is to provide reliable means for automatically properly positioning articles on a fast moving carrier unit which may not have been properly positioned thereon during the loading operation.

In accordance with one aspect of the present invention, the design of the carrier units of the conveyor system and the loading apparatus are integrated to provide a highly efficient, and reliable loading and conveyor system where fast moving carrier units are loaded while moving at relatively high speeds past one or more loading stations. To this end, each loading station most advantageously comprises a platform for supporting an article to be loaded onto an empty carrier unit, the platform including an article impelling means which is normally incapable of feeding the article off the platform. The platform preferably includes a number of rollers mounted on a vertically movable frame and the impelling means thereof most advantageously comprises a series of continuously driven endless conveyor belts which extend between the rollers at an elevation below the tops of the rollers and angled in the direction of movement of the carrier units past the discharge station. The velocity component of the belts which is parallel to the moving carrier units is approximately equal to the velocity of the carrier units. Since the conveyor belts normally are positioned below the tops of the rollers, they are not in a position to impel the article on the platform. When a loading operation is called for, the roller carrying frame is lowered bringing the article on the rollers upon the continuously moving conveyor belts which impel the article involved toward and beyond the discharge end of the platform where the article is delivered with little or no shock onto an empty carrier unit.

The carrier units preferably are open at the side facing the loading station and the discharge end of each loading station platform is approximately at or slightly above the level of the bottom of the carrier unit so that the articles do not drop any appreciable distance as they are delivered to the carrier units.

In accordance with another aspect of the invention, the platform of each loading station includes an inlet abutment gate which normally prevents the movement of an article on an inlet conveyor unit onto the loading station platform. Behind this gate, the inlet conveyor unit continuously impels the first article on the inlet conveyor unit against the gate toward the loading station platform. The gate is automatically lowered to enable the latter article to move onto the loading station platform when an article on the platform is loaded onto a carrier unit. An article sensing means such as a photocell sensing device, senses the movement of an article past the discharge end of the loading station platform and effects the lowering of the aforementioned inlet gate.

As previously indicated, one of the important aspects of the invention is that it provides automatic loading and conveyor apparatus wherein the loading apparatus loads only empty carrier units, permitting recirculation of full carrier units or loading from two or more loading stations. The loading apparatus described above is located completely to one side of the conveyor apparatus where it does not interfere with the passage thereby of a loaded carrier unit.

In accordance with still another feature of the present invention, the initiation of the movement of an article from the loading station onto a carrier unit is selectively controlled by the movement of an empty carrier unit into position opposite the loading station. If a full carrier unit is moved into this position, the loading apparatus will not operate to impel an article onto the loaded carrier unit to avoid collision between an article being loaded and an article already loaded on a carrier unit. To this end, a carrier sensing means and an article sensing means are provided which sense both the moving of a carrier unit into a loading position and the presence or absence of an article on the carrier unit. When an empty carrier unit is moved into a loading position, the former means renders the article impelling means of the loading station operative to impel an article onto the empty carrier unit involved.

Each carrier unit most advantageously comprises a tiltable carrier body having a trough-shaped bottom wall terminating in flange-less side edges which enable an article to be slipped onto or off either side of the carrier body. Each carrier body further has front and rear walls for preventing an article from falling off the front or rear of the carrier body. In accordance with a specific preferred aspect of the invention, as a carrier approaches a loading station, means are provided for tilting the carrier body away from the loading station so that the portion of the carrier body bottom wall nearest the loading station inclines downwardly away from the station and the outer edge thereof is at or somewhat lower than the elevation of the discharge end of the loading station. Accordingly, when an article is impelled onto the tilted carrier unit from the loading station platform, the article will slide by force of gravity into a proper centered position on the carrier body. Means are provided for uprighting the tilted carrier body as it leaves the loading station.

In some cases, the article may topple over and fall off the far end of the tilted carrier body. To prevent this result, it is preferable to place an external stationary back-up wall opposite the loading station against which an article impelled onto a carrier unit comes to rest. The back-up wall thus acts as an article positioning wall as well as a stop wall to prevent an article from falling off the tilted carrier body. These results could also be achieved by placing a side wall on the outer side of the carrier body, but this would not be desirable where it is frequently necessary to load an article onto or discharge an article from either side of the carrier body.

The above and other objects, advantages and features of the invention will become apparent upon making reference to the specification to follow, the claims and the drawings wherein:

FIG. 1 is a plan view of a conveyor system with a pair of loading stations therefor constructed in accordance with the present invention;

FIG. 2 is a sectional view through a portion of one of the loading stations in FIG. 1, taken substantially along the line 2—2 thereof;

FIG. 3 is a side elevational view of one of the carrier units of the conveyor system of FIG. 1;

FIG. 4 is a transverse sectional view of the carrier unit of FIG. 1 in a tilted position opposite one of the loading stations of FIG. 1;

FIG. 5 is an enlarged plan view of one of the loading stations of FIG. 1;

FIG. 6 is a fragmentary enlarged plan view of a portion of the inlet conveyor forming part of the loading station of FIG. 5;

FIG. 7 is a side elevational view partly broken away of the inlet conveyor and the gate at the outlet thereof;

FIG. 8 is a fragmentary horizontal sectional view through FIG. 7 taken substantially along the line 8—8 thereof;

FIG. 9 is an end elevational view of the gate of FIG. 7 and the gate operating apparatus therefor;

FIG. 10 is a horizontal sectional view through the gate of FIG. 9, taken substantially along the line 10—10 thereof;

FIG. 11 is a vertical fragmentary sectional view through one of the loading platforms of one of the loading stations showing the rollers which support an article in a stationary condition on the platform, and the belt conveyor which impels an article on the platform onto a carrier unit;

FIG. 12 is a side elevational view of the roller carrying frame which supports the rollers of FIG. 11;

FIG. 13 is a sectional view through FIG. 12, taken substantially along the line 13—13 thereof;

FIG. 14 is a plan view of the outlet gate of one of the loading platforms of FIG. 1 and the gate operating apparatus therefor;

FIG. 15 is an elevational view of the gate and operating apparatus therefor shown in FIG. 14; and FIGS. 15A and 15B are diagrams of the electrical circuitry for controlling the various moving instrumentalities of the loading and conveyor apparatus of FIGS. 1 through 14.

General description

Referring now more particularly to FIGS. 1–4, the loading and conveyor apparatus of the present invention thereshown includes an endless conveyor system generally indicated by reference numeral 2 which has individual spaced carrier units 4 (some of which are individually identified by reference numerals −0, −1, −2, −3, etc., following the reference numeral 4) with vertical wheels 6 riding on the tops of laterally spaced rails 8—8 forming an endless path for the carrier units. Each of the illustrated carrier units has one or more horizontally oriented rollers 10 riding in the lower portion of a vertical guide channel 11 formed by spaced angle members 12—12 centered between the rails 8—8. The carrier units 4 are moved along the rails 8—8 in any suitable way, as by a suitable endless chain 15 anchored to the base portion of each carrier unit.

Each carrier unit preferably has a tiltable body 4a normally held in an upright position by a horizontally oriented roller 13 (FIG. 4) riding in the upper portion of the guide channel 11. The carrier unit body 4a may be tilted in a manner to be explained. The carrier unit body 4a has a trough-shaped bottom wall forming by intersecting inclined wall portions 14a—14a terminating at the front and rear of each carrier unit body in upstanding flanges 14b—14b. The carrier unit body has no side walls extending upwardly from the side margins of the trough-shaped bottom wall thereof, so that a package can be readily slid onto or off either side of the carrier unit body by tilting the same to one side or the other in a manner to be explained.

As shown in FIG. 1, the conveyor system 2 carries the conveyor units 4 past a pair of spaced loading stations generally indicated by reference numerals 15–1 and 15–2. As illustrated, each loading station includes an inlet roller conveyor 16 and a loading platform 18. The inlet roller conveyor system is continuously driven so that an article placed thereon will be impelled toward the platform 18, but the article is normally prevented from rolling onto the platform by a suitable inlet gate 20 to be described. An operator standing at a stationary elevated platform 22 next to the inlet roller conveyor may control the movement of articles onto the stationary platform 22 by a belt conveyor 24. To this end, a control panel 26 may be provided having a control button which operates the conveyor 24 and other control switches which among other things, determines the particular discharge station (not shown) at which a particular article on the loading platform is to be discharged from the carrier unit on which it is to be loaded.

As will appear, the raising and the lowering of the inlet gate 20 automatically is controlled in the preferred form of the invention by an inlet gate photocell control system 28 which senses the passing of an article from the inlet roller conveyor to the platform 18 when the gate 20 is lowered, and then raises the gate 20 to prevent the passage of an article onto the platform 18 until the article then on the platform 18 is delivered to a carrier unit. The passage of an article onto a carrier unit is sensed by a second photocell system 30, to be described. Upon the occurrence of the last event, the inlet gate 20 is lowered to permit the passage of the next article on the inlet roller conveyor 16 onto the loading platform 18.

Each loading platform 18 has an inlet section 18a (FIG. 5) which is somewhat larger than the size of the largest article to be accommodated thereby, and a discharge section 18b which includes a discharge and portion 18b' facing the conveyor system. The outermost extremity of the inlet portion 18a of the loading station platform 18 is defined by a gate which is illustrated as comprising a series of longitudinally spaced fingers 31. The inlet portion 18a of the loading platform most advantageously includes a series of rollers 32 upon which an article delivered to the loading platform is supported.

As best shown in FIG. 5, the rollers 32 rotate along horizontal axes extending longitudinally of the conveyor system so that the rollers guide each article delivered thereto against the gate forming fingers 31. The rollers 32 are aligned in rows extending along spaced lines inclining at an angle of about 45 degrees. A series of vertically oriented endless belts 33 are provided extending along 45 degree angled lines extending toward and in the direction of movement of the carrier units. The belts 33 pass between the inclined rows of rollers 32, the upper section of the belts being positioned in a common horizontal plane normally positioned somewhat below the plane of the upper extremities of the rollers 32. In a manner to be described, when it is desired to impel an article from the loading platform 18 onto a carrier unit, the gate-forming fingers 31 and the rollers 32 are lowered to drop the article on the rollers upon the upper section of the conveyor belts 33 moving toward the discharge end portion 18b' of the loading platform. The conveyor belts 33 are operated at such a speed that the component of movement thereof parallel to the direction of movement of the carrier units by the loading station is equal to the velocity of movement of the carrier units thereby, so that an article is impelled upon a carrier unit with little or no shock. The aforementioned photocell system 30 is positioned adjacent to the discharge end portion of the loading platform 18. As soon as an article moves past the photocell system 30, the fingers 31 and the rollers 32 are moved into an uppermost position and the inlet gate 20 drops to allow the next article on the inlet roller conveyor 16 to pass upon the loading platform 18.

The loading and conveyor apparatus illustrated in the drawings are so designed that the movement of an article from the loading platform 18 takes place automatically only when an empty carrier unit is moved opposite the loading station involved. The presence of an empty unit approaching each loading station is most advantageously sensed by full carrier sensing photocell system 37 which is preferably spaced more than one carrier unit length in advance of each loading station involved. (Due to a limitation of space in FIG. 1, only the photocell system 37 in advance of the second loading station 15-2 is illustrated.) The photocell 37 (as well as the other photocell systems referred to) may comprise a light source 37a which directs a beam into a light beam receiver unit 37b which includes an amplifier and a relay or the like which opens or closes contacts in response to the reception and interruption of the light beam. The photocell system 37 now being described directs its beam at a level above the uppermost portion of each carrier unit, so that the beam involved is interrupted only when the carrier unit is carrying an article. The illustrated photocell system 37 associated with each loading station is spaced roughly two carrier lengths from the loading station involved, and so a memory means to be described is provided for memorizing the presence of a full carrier unit so that when a full carrier unit is then moved opposite the loading station the loading apparatus will be rendered inoperative to feed an article onto the same.

For properly timing the initiation of a loading operation, a carrier sensing photocell system 40 is provided which comprises a light source which directs a light beam in a downward direction and a light beam receiving unit which is similar to the light beam receiving unit 37b which receives the beam from the light source 40a unless the beam is obstructed by a carrier unit. When the latter beam is obstructed by a carrier unit, the carrier unit which is directly opposite the loading station involved will be in a position to receive an article thereon and, unless the aforesaid memory means indicates that the carrier unit opposite the loading station is a full carrier unit, the rollers 32 and gate-forming fingers 30 are lowered to effect the movement of an article onto the empty carrier unit.

The sensing of a full carrier unit at a point spaced on one or more carrier unit lengths from the loading station is advantageous for a number of reasons, one of which is that it gives time to carry out other operations to be described, such as erasing discharge point identifying magnetic code information on a magnetizable surface 43 on the bottom of the carrier unit ahead of the loading station by an erasing head 39. Also, there is more flexibility in the positioning of the photocell units. The means for the selective control of the point of discharge of an article on a tiltable carrier unit by magnetic coded information placed on the cam unit is now well known. As previously indicated, the operator at each loading station 15-1 and 15-2 operates controls on the associated control box 26 which identifies a discharge point for the article then on the loading platform 18. A loading operation is inhibited unless the operator assigns a discharge point to the article on this manner. A magnetic recording head 41 beneath the conveyor system at the loading station will then transfer the discharge point identifying information automatically onto the magnetizable surface 43 of the bottom of the next empty carrier unit moved opposite the loading station.

As previously indicated, in the preferred form of the invention, each of the carrier units has a carrier body 4a which is adapted to be tilted for loading or discharging purposes. The carrier body may be tilted all the way over for discharge purposes or it may be tilted to a small degree as illustrated in FIG. 4 as an aid in the loading process. As thereshown, the carrier body 4a has rollers 45—45 on opposite sides thereof which ride upon cam tracks 47—47 which control the angle of tilt of each carrier unit body. To enable the cam tracks to control the angle of tilt of the carrier bodies, the upper sections of the guide channel forming angle members 12—12 are removed opposite the cam tracks so that the guide rollers 13 of the carrier units are not confined by the angle members. As each carrier unit is moved opposite a loading station, the carrier body is tilted by the cam tracks slightly away from the loading station so that the bottom wall portion 14a of the carrier unit body next to the loading station tilts substantially downwardly away from the loading station and the uppermost portion of the latter bottom wall portion will be at or slightly below the elevation of the upper section of the conveyor belts 33. The general inclination of the latter bottom wall portion 14a normally carry an article by gravity fully into the carrier unit. The article is prevented from falling off the lower side of the carrier unit body by a stationary back-up wall 49 extending over the portion of the conveyor system path of travel where the carrier unit bodies remain tilted. In most cases it is desirable to move each carrier unit body into an upright position also levelling the cam tracks 47—47, as it leaves the loading station.

When a carrier unit reaches a discharge station (not shown) at which an article is to be discharged, the carrier unit body thereof may be tilted in any one of a number of ways such as by use of cam tracks like 47—47 in FIG. 4 or other means. In a case where there are two or more discharge stations at which an article can be selectively discharged as in the exemplary illustrated forms of the invention being described, a movable carrier tilting element (not shown because the invention does not deal with the movement of carrier tilting) may be provided opposite each discharge station which can be selectively brought into position to engage the rollers 45 or other portion of a carrier unit to tilt the carrier unit body 4a involved. The rollers 13 must be permitted to leave the channel 11 in such event by a gate (not shown) provided for this purpose or by interrupting the channel at this point.

Now that the general features of the various components making up the preferred form of the present invention have been described, a more detailed description thereof will be shown.

Inlet roller conveyor and gate details

The inlet roller conveyor 16 illustrated in the drawings includes a number of longitudinally spaced rollers 60. A chain drive 62 (FIG. 6) drives one set of alternate rollers 60 and a chain drive 62' drives the other rollers 60. The last roller 63 of the inlet roller conveyor is a rubber covered roller 63 of much larger size than the rollers 60. The roller 63 has a reduced end portion 63' carrying sprocket wheels 64–64' engaged by the chain drives 62–62'. Because the roller 63 is larger than the other rollers 60, the peripheral speed of the roller 63 is greater than that of the other rollers which results in a separation of the first article passing by the roller 63 from the preceding article.

The roller 63 has a shaft 65 carrying a pulley 66 (FIG. 9) driven by a belt 67 passing around a pulley 68 on a shaft 69. The shaft 69 carries a pulley 70 driven by a belt 67' passing around a pulley 70', on the shaft 70' of an electric motor 70.

As previously indicated, articles on the inlet roller conveyor are normally prevented from moving off the inlet roller conveyor 16 by a gate 20 which is normally in a raised position as shown in FIG. 7. The gate 20 comprises a vertical wall extending from a frame 71 guided at each side by grooved wheels 72—72, riding on vertical triangular tracks 74—74. The gate wall 20 is kept in a stable horizontal position by a pair of vertical racks 75—75 carrier by the frame 71 which mesh with a pair of idler pinions 76—76 (FIG. 10) carried on a shaft 77.

The up and down movement of the gate frame 71 is controlled by an air cylinder 78 containing a piston (not shown) controlled by compressed air directed to one end or the other of the cylinder by a suitable four-way valve (not shown). The air cylinder piston is connected to an operating rod 80 which, in one extreme position of the piston, positions the gate 20 to its uppermost position shown in the drawings and, in its other extreme position, lowers the gate 20 below the level of the rollers 60 and 63 of the inlet roller conveyor so that an article on the inlet roller is impelled onto the inlet section 18a of the loading platform 18.

Loading platform and gate

The loading platform 18 of each loading station includes a vertically movable frame 90 (FIGS. 11 and 12) to which is secured upwardly extending brackets 92 carrying on the top thereof the aforementioned rollers 32. As previously indicated, the rollers 32 are aligned in rows following spaced 45 degree angled lines, and narrow conveyor belts 33, are positioned between these inclined rows of rollers. The upper sections of the conveyor belts 33 run within stationary guide members 93 carried on the tops of fixedly anchored channel members 94. The conveyor belts project above the guide members 93 and pass around the pulleys 99–99' (FIG. 5). The pulleys 99' or 99 are driven in any suitable way through suitable belt drive mechanisms (not shown) or the like driven by an electric motor (not shown).

The belt pulleys 99 adjacent the discharge end portion 18b' of the loading platform 18 are staggered to provide clearance spaces for idler rollers 96 which are mounted for rotation about axes extending at right angles to the inclined direction of movement of the conveyor belts 33. As previously indicated, when the rollers 32 are lowered, the upper plane of the rollers will be below the upper section of the conveyor belts 33 so that the article carried by the rollers will be impelled onto an empty carrier unit passing by the loading station.

The roller carrying frame 90 is moved up and down by a suitable linkage arrangement best shown in FIG. 12. The frame 90 rests upon rollers 96—96 extending eccentrically from links 98—98 supported for pivotal movement about stationary pivot shafts 100—100. The bottom ends of the links 98—98 are pivotally secured to a reciprocating arm 102 attached to a crank 104 driven by the output shaft 105 of a speed reducing unit 106. FIG. 12 illustrates the position of the reciprocating arm 102 and the links 98 where the rollers 96—96 are in their lowermost position.

The speed reducing unit 106 is driven by a solenoid operated clutch-brake unit 108. The clutch-brake unit has a clutch solenoid (not shown) which, when energized, couples the shaft 110' of an electric motor 110 to the input shaft 106' of the speed reducing unit 106 and a brake solenoid which, when energized, stops the rotation of shaft 106'. In a manner to be explained, the brake solenoid is momentarily automatically energized at the end of each half revolution of an output shaft 105 of the speed reducing unit 106. The brake solenoid and the clutch solenoid are energized and deenergized by contacts to be described controlled by limit switches LS2 and LS3 shown in FIG. 15B which are opened and closed as the rollers 32 and fingers 31 reach their uppermost and lowermost positions, and by other contacts also shown in FIG. 15B controlled by the photocell systems 28 and 30. Thus, the reciprocating arm 102 is alternately moved between the left hand position shown in solid lines in FIG. 12 to a right hand position shown in dashed line therein. When the reciprocating arm 102 is in said right hand position, the cranks 98—98 are moved to the right to raise the rollers 96—96 which in turn raises the frame 90 and the rollers 32 carried thereby to their upper position.

As previously indicated, the rollers 32 are raised and lowered together with the gate-forming fingers 30. The gate forming fingers 31 are carried upon a suitable channel bar 110 (FIGS. 14–15) which has a horizontal channel 112 in which a pair of rollers 114—114' ride. The channel frame 110 is guided for vertical movement by grooved wheels 111—111 carried thereby riding in triangular shaped tracks 113—113 (FIG. 14). The rollers 114'—114' are respectively carried by the upper arms 116a and 116a' of center pivoted levers 116—116'. When the levers 116–116' are in their uppermost position shown in solid lines in FIG. 14, the rollers 114 and 114' are in their uppermost positions which elevate the channel bar 110 where the gate-forming fingers 31 project above the level of the rollers 32 to prevent movement of the article on the loading platform off beyond the rollers 32.

The bottom arm 116b of the lever 116 is connected by a rod 119 to the upper arm 116a' of the lever 116', and the bottom arm 116b' of the lever 116' is connected by an arm 120 to a crank 122 carried on the output shaft 105' of the aforesaid speed reducing unit 106.

When the crank 122 is rotated 180 degrees from the position shown in FIGS. 14 and 15, the upper arm 116a' of the lever 116' is moved downwardly to the right and the upper arm 116a of the lever 116 moves downwardly to the left. The rollers 114–114' carried by the upper arms 116a–116a' of the levers 116–116' to a lower position which carries with it the channel bar 110 carrying the gate-forming fingers 30.

If, for any reason, an article moved onto a conveyor unit is not dropped fully into position therein so that the article projects substantially beyond the edge of the conveyor unit, the article is moved fully onto the conveyor unit by a stationary article positioning means 51 located just beyond the end of the loading platform 18. The article positioning means 51 has an inclined package engaging camming surface formed by a wall 51a which inclines forwardly and inwardly so that an article which is not moved fully onto the conveyor unit involved at the loading platform 18 will be engaged by the wall surface 51a and moved into proper position on the conveyor unit.

Electrical control circuit FIGS. 15A and 15B

Referring now to FIG. 15A which shows a portion of the electrical control circuit which operates parts of the loading and conveyor apparatus previously described associated with each loading station. The circuit there-shown operates from a suitable source of voltage which may be a commercial 60 cycle per second power system including power lines 130–130′. A main control relay R1 is provided which is energized through a branch circuit connected between the power lines 130–130′. This branch circuit includes a normally closed push botton stop switch PB–1 connected to power line 130, a normally open push button start switch PD–2 and the relay R1 (i.e. the winding thereof) connected to power line 130′. When the start push button switch is momentarily depressed, the relay R1 is energized and then held energized through a group of series connected contacts including holding contacts R1–1 of the control relay R1 and contacts M1–1, M2–1, M3–1, and M4–1 of a series of motor starter relays M1, M2, M3, and M4 which control the operation of the various motors which drive the carrier units 4, the conveyor belts 33, the rollers on the inlet roller conveyors 16 and the speed reducing unit 106. (The contacts of relay R1 and the other relays to be described will be identified by reference numbers –1, –2, –3 etc. following the reference character used to identify the relay.)

The energization circuit for the motor starter relays M1, M2, M3 and M4 are each connected to a common bus 131 which is, in turn, connected through a set of normally-open contacts R1–2 of relay R1 to the side of the stop push button PB–1 remote from the power line 130. When the control relay R1 is energized, the voltage on the power line 130 is coupled through the stop push button switch PB–1 and the contacts R1–2 to the common bus 131. The various motor starter relays M1, M2, M3 and M4 are respectively coupled through overload contacts OL–1, OL–2, OL–3 and OL–4 to the other power line 130′, so, if any of the motors become overloaded, the associated overload contacts will open to deenergize the associated motor M1 and the control relay R1.

The various photocell systems 28, 30, 37 and 40 are respectively connected permanently between the common bus 131 and the power line 130′ so that the photocell systems are energized whenever the control relay R1 is energized. The photocell systems referred to, respectively include light sources 28a, 30a, 37a and 40a and photocell receiver units 28b, 30b, 37b and 40b (also identified by the reference characters PE1, PE2, PE3 and PE4) of more or less conventional design. The various photocell receiver units will hereafter be referred to as full carrier sensor PE1, carrier position sensor PE2, inlet gate cleared sensor PE3 and outlet gate cleared sensor PE4. Each of these sensors have one or more contacts which are identified in the circuit by the letters PE followed by a number used to identify the associated sensor and a further number –1, –2, –3 etc. identifying the particular set of contacts involved. When the circuit diagram shows a set of contacts of a photocell sensor closed, this means that the contacts are normally closed during the deenergized state of the sensor which occurs either when the voltage applied to the sensor is removed or when the light beam which normally impinges thereon is interrupted. Thus, normally closed contacts are closed when the beam is interrupted and are open when the beam strikes the particular sensor involved. Also, when the circuit shows a set of contacts of a photocell open, this means that the contacts are normally open when the voltage to the sensor is disconnected or the associated beam is interrupted and the contacts are closed when the light beam strikes the sensor.

The control circuit includes a stepping switch (or the electronic equivalent thereof) for scanning a series of relays which are preferably latch relays R4, R5, R6, R7. Such relays have two coils, one for latching the relays when energized, such coils being identified by reference characters R4′, R5′, R6′ and R7′, and one for unlatching the relay when energized, such coils being identified by reference characters R4″, R5″, R6″ and R7″ (shown in FIG. 15B). The contacts of these relays are identified by the same reference characters as the relay involved followed by a number –1, –2, –3, etc. identifying the particular set of contacts involved. The open and closed conditions of the contacts of these relays shown in FIGS. 15A and 15B indicate the contact conditions when the relays are in their unlatched state. At any given instant, the latched and unlatched conditions of three of these relays respectively indicate the empty and full condition of the three carrier units at and immediately behind the association loading stations, such as carrier units 4–1, 4–2, and 4–3 in FIG. 1. Thus, a latched state of one of the relays indicates that the carrier assigned thereto in full and that a loading operation should not be carried out when the particular carrier unit reaches the loading station involved. On the other hand, if the relay is in an unlatched state, this signifies that the carrier unit to which it is assigned is empty and should be loaded when it reaches the loading station involved.

The carrier unit 4–3 shown in FIG. 1 has just reached the photocell systems 37 and 40 spaced about two carrier unit lengths from the loading station 15–2 and the full or empty condition thereof will be indicated by the latch relay which was previously assigned to the carrier unit 4–0 which just left the loading station 15–2. If the carrier unit 4–3 is full, the light beam of the light source 37a will be interrupted to effect latching of the relay referred to in a manner to be described. As previously indicated, as each carrier unit (like 4–3) interrupts the light beam of the other photocell system 40, a carrier unit will then be in a position opposite the discharge station 15–2 where a loading operation will be initiated if the latter carrier unit is empty as determined by the condition of the associated latch relay. The interruption of the light beam of the carrier position photocell system 40 will thereby act as a timing signal source which initiates a loading operation at the proper time if one is called for. Such a timing signal also initiates other operations previously referred to, such as by an erase operation by the erase head 39 on the magnetizable surface 43 on the bottom of the carrier unit (like 4–2) in position over the erase head, a recording operation by the recording head 41 on the previously erased magnetizable surface 43 on an empty carrier unit (like 4–1) then opposite the loading station 15–2 and the resetting or unlatching of the relay associated with the carrier unit (like 4–0) which just moved past the loading station 15–2.

The stepping switch of FIGS. 15A and 15B previously referred to is identified therein by reference numeral 140 and, in the illustrated embodiment of the invention has four ganged switching levels including movable wipers 140–1, 140–2, 140–3 and 140–4 which make successive contact with associated stationary contacts Nos. 1, 2, 3, or 4. In FIGS. 15A or 15B, the wipers 140–1 through 140–4 are shown half way between contacts Nos. 4 and 1 so that when they are moved one half a contact spacing in a normal clockwise direction, they will make contact with the No. 1 stationary contacts of the various switch levels.

The wipers 140–1 through 140–4 of the stepping switch 140 are advanced under control of a stepping solenoid R2. When the stepping solenoid R2 is deenergized, each wiper will be in a position between a pair of the stationary contacts of the associated switch level. When the stepping solenoid becomes energized, each wiper will be advanced into engagement with the next stationary contact and when the solenoid is subsequently deenergized, each wiper will be positioned between the contact it just engaged and the next contact to be engaged.

The stepping solenoid R2 is in a branch circuit extending betwen the common bus 131 and the power line 130', which branch circuit includes normally closed contacts PE2–1 of the carrier position sensor PE2. Thus, as each carrier unit interrupts the beam of the photocell system 40, the then open contacts PE2–1 will close to energize the stepping solenoid R2 to advance the wipers 140–1 through 140–4 to the next stationary contact position.

Assuming that the carrier units are just moved into the positions shown in FIG. 1 where the carrier unit 4–3 opposite the carrier position and full carrier sensors 37b and 40b, the wipers 140–1 through 140–4 are moved into engagement with the No. 1 contacts which places the latching coil R4' connected between the power line 130' and the No. 1 contact of the first stepping switch level in circuit with normally closed contacts PE1–1 and normally open contacts R3–1 of a carrier position relay R3 which contacts are connected between the bus 131 and wiper 140–1. The normally closed contacts PE1–1 are contacts of the full carrier sensor PE1 which will be closed if the light beam of the full carrier sensing photocell system 37 is interrupted. The normally open contacts R3–1 of the carrier unit position relay R3 are closed when the light beam of the carrier position sensing photocell system 40 is interrupted. The relay R3 is connected in a branch circuit between the bus 131 and the power line 130' which includes only normally closed contacts PE2–3 of the carrier position sensor PE2, so that the relay R3 merely increases the effective number of contacts of the carrier position sensor PE2. It is apparent that the latching coil R4' of the latch relay R4 will be deenergized if the carrier unit 4–3 is empty and will be energized if the carrier unit 4–3 is full. Also, as successive carrier units interrupt the light beam of the carrier positioning photocell system 40, the wipers of the stepping switch will advance one contact position.

The full or empty condition of the carrier unit 4–2 immediately in advance of the carrier unit 4–3 in the example now being discussed is indicated by the latched or unlatched condition of the latch relay R7 whose latching coil R7' is connected between the power line 130' and the No. 4 stationary contact of the first level of the stepping switch which was scanned by the switch just before latch relay R4 was scanned thereby. Also, the full or empty condition of the carrier unit 4–1 then opposite the loading station 15–2 is indicated by the latched or unlatched condition of the latch relay R6 whose latching coil R6' is connected between the power line 130' and the No. 3 stationary contact of the first level of the stepping switch.

At the instant under consideration, the latch relay R5 which was previously assigned to the carrier unit 4–0 which just moved past the loading station 15–2 is assigned to the carrier unit 4–1 opposite the loading station. The latch relay R5 has a latching coil R5' connected between the power line 130' and the No. 2 contact of the first level of the stepping switch. The wiper 140–2 of the second level of the stepping switch is associated with a circuit which controls the energization and deenergization of the erase head 39. The wiper 140–2 is connected through a set of normally-open contacts R3–2 of the carrier position relay R3 to the common bus 131 which contacts are closed whenever the light beam of the carrier position sensing photocell system 40 is interrupted. The No. 1 through No. 4 contacts of the second level of the stepping switch are respectively connected through normally closed contacts R7–1, R4–1, R5–1 and R6–1 of the latch relays R7, R4, R5 and R6 (which contacts being closed when the carrier unit to which they are assigned are empty) either directly to the erase head 39 or, as illustrated, to one side of an erase control unit 143 which is a commercially available unit sold by the Maitrol Division of Maico Electronics, Inc., in Minneapolis, Minnesota. When the erase control unit 143 is energized, it will effect the energization of the erase head 39 to erase any magnetic information recorded on the magnetizable surface 43 on the bottom of the carrier unit like 4–2 then in position over the erase head. The erase control unit 143 is connected between the power line 130' and the commonly connected terminals of normally closed contacts R7–1, R4–1, R5–1 and R6–1 whose other terminals are respectively connected to the Nos. 1, 2, 3, and 4 contacts of the second level of the stepping switch. The associated wiper 140–2 will be on the stationary contact associated with the set of contacts of the latch relay assigned to the carrier unit like 4–2 located above the erase head 39. Since the contacts R7–1, R4–1, R5–1 and R6–1 are closed only when the carrier units are empty, an erasing operation will be carried out only when the carrier unit above the erase head 39 is an empty carrier unit.

The third level of the stepping switch controls the loading of an article onto the associated loading station. To this end, the wiper 140–3 (FIG. 15B) of the third level of the stepping switch is connected to the common bus 131 through a normally open set of contacts R3–3 of the carrier position relay R3 which contacts are closed whenever the light beam of the carrier position sensing photocell system 40 is interrupted. The Nos. 1–4 contacts of the third level of the stepping switch engaged by the wiper 140–3 are respectively connected through normally closed latch relay contacts (which are closed when the associated carrier units are empty) to one terminal of a load control relay R8 whose opposite terminal is connected to the power line 130'. It can be seen that the wiper 140–3 will be connected to the stepping switch stationary contact connected to the contacts of the latch relay which is assigned to the carrier unit which is opposite the loading station at any instant. If the contacts R6–2, R7–2, R4–2 or R6–2 connected to the wiper 140–3 are closed to indicate that the carrier unit involved is empty, the relay R8 will be energized to effect a loading operation if other conditions are satisfied, as will be explained.

The fourth level of the stepping switch controls the resetting of the latch relays by effecting energization of the latching coil R4'', R5'', R6'' or R7'' of the latch relay assigned to the carrier unit which is moved one position beyond the loading station involved. To this end, the wiper 140–3 of the fourth level stepping switch is connected through a normally open set of contacts R3–4 of the carrier position relay to the common bus 131. As indicated above, the contacts R3–4 are closed when a carrier unit is obstructing the light beam associated with the carrier position sensing photocell system 40. The Nos. 1, 2, 3, and 4 contacts of the fourth level of the stepping switch are respectively connected through the unlatching relay coils R4'', R5'', R6'' and R7'' to the power line 130'. It is thus apparent that the wiper 140–4 will be connected to the unlatching relay coil associated with the carrier unit which just left the loading station to effect a resetting or unlatching of the latch relay involved if the relay was previously latched so that it can be assigned to the next carrier unit to be moved opposite the photocell sensing systems 37 and 40.

It will be recalled that one operation to be performed at the loading station is the recording of coded information on the magnetizable surface 43 at the bottom of an empty carrier unit which indicates the discharge station at which the article to be placed on the carrier unit is to be discharged. (Since the manner in which a discharge operation is triggered at a discharge station by moving a suitable carrier unit tilting element into position in response to coded information read by a reading head at the discharge station is well known, a description of the reading head portion of the system is omitted.) To this end, a recording control unit 145, which is also manufactured by the Maitrol Division of Maico Electronics, Inc. may be provided which controls the energization of the recording head 41 positioned opposite the loading station. (The particular details of the recording control unit 145 are also unimportant and it could be replaced by a recording head comprising individual magnetizing coils (not shown) connected in parallel through contacts controlled by the manual switches on the control panel 26 which are set by the operator to identify the particular discharge station at which the article to be loaded is to be discharged.) In the Maitrol system, the recording control unit 145 is energized from a station selection control unit 147 which includes manual switches (not shown) the depression of one of which sets up or prepares a recording head energizing circuit leading to one of the individual coils forming the recording head 41 for energization upon closure of a group of series connected contacts R8–1, R#3–1 and R9–1 connected between the common bus 131 and one side of the recording control unit 145. The other side of the latter unit is connected to the power line 130′. The station selection control unit 147 is connected directly between the common bus 131 and the power line 130′. The Maitrol station selection control unit 147 has a set of contacts 147–1 in a branch circuit to be described which are closed when the operator has operated one of the manual switches referred to and are opened after the discharge station information has been recorded by the recording head 41.

The contacts R8–1 are normally open contacts which are closed when the load control relay R8 is energized. The contacts PE3–1 are normally open contacts which are closed when the light beam of the light source 28a strikes the inlet gate cleared sensor PE3. Contacts R8–1 are normally open contacts of a clutch-brake control. The contacts just described will be closed when all of the conditions are met in effecting a loading operation of the carrier involved.

As previously indicated, a loading operation is carried out when the loading platform rollers 32 and the gate-forming fingers 31 are lowered to drop the article in question onto the conveyor belts 33 to permit passage of the article involved off the loading platform onto a carrier unit. The raising and lowering of the rollers 32 in the gate-forming fingers 31 are under control of the clutch-brake unit 108 (FIG. 13) including a brake solenoid 150 and a clutch solenoid 152 shown in FIG. 15B. These solenoids are preferably direct current solenoids and so a D.C. power circuit 154 is provided extending between the common bus 131 and the power line 130′ which produces a direct current voltage across the output lines 155–155′ thereof. The brake solenoid 150 is connected across the lines 144 and 155′ by normally closed contacts R9–1 of a clutch-brake control relay R9. The clutch solenoid 152 is connected across the lines 155 and 155′ by normally open contacts R9–2 of the clutch-brake control relay R9. It is, therefore, apparent that when the relay R9 is energized, the clutch solenoid 142 will be energized to effect energization of the output shaft 105 of the speed reducing unit 106.

As will appear, the clutch-brake solenoid 152 becomes energized to initiate movement of the speed reducing unit output shaft 105 and the lowering or the raising of the rollers 32 and the gate-forming fingers 31 upon closure of the contacts R9–2 due to the energization of relay R9. The brake solenoid 150 becomes energized as the rollers 32 reach the bottommost or uppermost points to prevent further rotation of the output shaft 105 of the speed reducing unit 106 upon closure of the contacts R9–1 when the relay R9 becomes deenergized.

The clutch-brake control relay R9 is connected between the power line 130′ and a common bus 131 by alternate paths created by a pair of series connected parallel circuits, one of which includes a limit switch LS2–2 closed for all positions of the rollers 32 except the uppermost position thereof. The limit switch is connected in parallel with a number of series connected contacts, namely contacts R8–2 of the load control relay R8, normally open contacts PE3–2 of the inlet gate cleared sensor PE3, normally closed contacts R10–1 of the latch relay to be described, normally open contacts R12–1 of an inlet gate raising relay R12, and the aforementioned contacts 147–1 of the station selection control unit 147.

The other parallel circuit associated with the clutch-brake control relay brake R9 comprises a normally closed limit switch LS3–1 which is closed for all positions of the rollers 32 except the bottommost position thereof. The limit switch LS3–1 is connected in parallel with a pair of series connected contacts, namely contacts PE4–1 of the outlet gate cleared sensor PE4, and normally open contacts R11–1 of an outlet gate lowering relay R11.

When a loading operation is to be initiated, the contacts R8–2, PE3–2, R10–1 and 147–1 will be closed along with contacts LS3–1, to effect energization of the clutch-brake control relay R9. This will result in the lowering of the aforementioned rollers 32 and the gate-forming fingers 31. As soon as the rollers 32 start to move down, the limit switch LS2–1 closes to maintain the energization of the clutch-brake relay R9 until the wheels are completely lowered. When the rollers reach the bottommost position to start a loading operation begins the limit switch LS3–1 will open to thereby energize the clutch-brake relay R9 and limit switch LS2–1 will be closed. For reasons to be explained, the inlet gate lowering relay R11 will be energized as the article being loaded is moved off the loading platform to close contacts R11–1. The relay R11 will remain energized until the rollers 32 are subsequently raised from their lowermost position. Consequently, the clutch-brake control relay R9 will again become energized as soon as the contacts PE4–1 of the sensor PE4 close as the article involved passes the outlet gate cleared sensing photocell system 30. The relay will remain energized until the rollers 32 reach their uppermost position due to the closure of the limit switch contacts LS3–1 and the rollers 32 are moved upward from their lowermost position. The resulting energization of relay R9 effects another half revolution of movement of the output shaft 105 of the speed reducing unit 106 for the reasons previously explained. The relay R9 becomes deenergized to energize the brake solenoid 152 upon the opening of limit switch LS2–1.

A latch relay R10 is provided having a latching relay coil R10′ and an unlatching coil R10′. The latching coil R10′ is connected between the power line 130′ and a limit switch LS2–2 which is a normally closed switch which opens when the rollers 32 are in their uppermost position. The limit switch is connected to the common bus 131 so that the latching coil R10′ is latched when a loading operation is initiated, causing the lowering of the rollers 32. The latching relay remains latched until energization of the unlatching coil R10″ which is connected between the power line 130′ and normally closed contacts R3–5 connected to the common bus 131. It will be recalled that the relay R3 controlling the contacts R3–5 will be in a deenergized state to effect closing of the contacts R3–5 when the light beam associated with the carrier position sensor photocell system 40 is unobstructed by a carrier unit and will be in an energized state to effect opening of the contacts R3–5 and energization of the latching relay when the latter light beam is obstructed by the passage of a carrier unit by the bus.

The inlet gate 20 is controlled by the inlet gate lowering relay R11. The inlet gate lowering R11 is connected between the power line 130′ and a set of normally closed contacts PE4–2 connected to the common bus 131. The contacts PE4–2 will be closed to energize the relay R11 when the light beam associated with the outlet gate cleared photocell system 30 is interrupted by an article moving past the photocell system onto a carrier unit. A holding circuit is established across the contacts PE4–2 which circuit contacts R11–2 and a normally open limit switch LS3–2 which is closed when the rollers 32 are in their lowermost position to maintain the holding circuit until the rollers 32 are moved from their lowermost position. When the inlet gate lowering relay R11 is energized, a lowering of the inlet gate 20 will occur upon closure of a normally open contacts PE4–3 controlled by the outlet gate cleared sensor PE4 which close as the article being loaded is moved off the loading platform 18. To this end, the contacts PE4–3 are connected between the common bus 131 and normally open contacts R11–3 of the inlet gate lowering relay R11. The latter contacts are connected to an inlet gate lowering solenoid V1a connected to the power line 130'. When the solenoid V1a is energized, the aforesaid four-way valve controlling the piston in the cylinder 78 (FIG. 9) will operate the aforesaid four-way valve to lower the piston in the cylinder 78 which lowers the gate 20.

The inlet gate raising relay R12 is connected between the power line 130' and a set of normally open contacts PE3–3 connected to the common bus 131 and in parallel with a holding circuit including normally closed contacts R9–3 in series with normally open contacts R12–2. The contacts PE3–3 will close when an article moves completely past the inlet gate cleared photocell sensing system 28 onto the loading platform 18. The energization of the relay R12 establishes the latter holding circuit upon closure of contacts R12–2 until a new loading operation is called for which energizes relay R19 to open the contacts R9–3.

The energization of the inlet gate raising relay R12 closes a set of normally open contacts R12–3 which effect energization of the inlet gate raising solenoid V1b. The contacts R12–13 and the solenoid V1b are connected in series with normally open contacts PE3–4 between the common bus 131 and the power line 130'. The contacts PE3–4 are closed when a new article has been fully moved onto the loading platform 18. Energization of the inlet gate raising solenoid V1b will result in the reverse operation of the aforementioned four-way valve which effects movement of the piston in the cylinder 78 into its uppermost position, resulting in raising of the inlet gate 20 in the manner previously explained.

It should be understood that numerous modifications can be made in the most preferred form of the invention described above without deviating from the broader aspects of the invention.

I claim:

1. In a conveyor and loading system including a series of longitudinally spaced article carriers and means for continuously moving said carriers along an endless path passing by at least one article loading station and one article discharging station, the improvement in means for loading articles onto a carrier moving past a loading station, said means comprising a platform at the loading station for supporting an article to be loaded onto a carrier, said platform having a discharge end facing the carriers moving by the loading station and article impelling means which, in response to a carrier condition signal which indicates the movement of a carrier opposite said loading station, momentarily impels an article on the platform at an angle towards said discharge end portion thereof at a speed which provides a velocity component parallel to the moving carrier which is of the same order of magnitude as the velocity of movement of the carriers moving past the loading station, whereby the article involved is impelled onto a carrier with litlte or no shock, said platform including a vertically movable support frame having an upper and a lower position and carrying spaced rollers on the top thereof which movingly support articles on the platform, said article impelling means comprising continuously moving impelling elements positioned between said rollers at a level below the tops of the rollers when said support frame is in said upper position, said rollers in the lower position of said support frame being below the level of the impelling elements of the conveyor, wherein the article on said platform will then be supported upon said impelling elements where it is impelled towards an empty carrier moving past the discharge end portion of the platform, and means responsive to the presence of a carrier adjacent said loading station for generating said carrier condition signal.

2. A conveyor and loading system including longitudinally spaced article carriers and means for moving said carriers in an endless path passing by at least one carrier loading station, the improvement comprising means for automatically loading articles on a carrier moving past said loading station comprising: platform means at said loading station for supporting an article adjacent thereto, said platform means having an article-receiving section and an article-discharging section adjacent to a portion of said endless path, said article-receiving section including an article impelling means for impelling an article on said article-receiving section to said article-discharging section, an inlet conveyor adjacent said article-receiving section of said platform means which inlet conveyor operates to impel an article onto the article-receiving section of said platform means, a first gate between said inlet conveyor and the article-receiving section of the platform and in a raised position prevents movement of the article onto said article-receiving section of the platform means and in a lowered position allows such movement, said inlet conveyor automatically moving an article against said first gate, said platform including article impelling means having a first condition where the article on said article-receiving section of the platform is impelled beyond a discharge end portion of the article discharging section of the platform, said article impelling means having a second condition where the article on said platform remains stationary, a second gate which is in a raised position prevents movement of an article onto said conveyor system and in a lowered position allows such movement, and control means responsive to movement of a carrier into a given position in the vicinity of said loading station for momentarily operating said article impelling means into said first condition and for lowering said second gate to effect loading of an article onto said carrier, and first article position sensing means for sensing the movement of an article from said platform means onto a carrier at said loading station by raising said second gate and lowering said first gate to allow a new article to move onto said platform means.

3. The conveyor and loading system of claim 2 wherein there is provided second article position sensing means responsive to the movement of a new article onto said platform means for raising said first gate.

4. In a conveyor and loading system including longitudinally spaced article carriers each having at least one open article-receiving side and means for continuously moving said carriers in an endless path passing by at least one carrier loading station where the open side thereof faces said station, the improvement comprising means for automatically loading an article onto a carrier moving past said loading station comprising platform means at said loading station for supporting an article adjacent thereto, said platform means having an article-receiving section and an article-discharging section adjacent a portion of the endless path, said article-receiving section including an article impelling means for impelling an article on said article-receiving section to said article-discharging section, an inlet conveyor adjacent said article-receiving section of said platform means which inlet conveyor operates to impel an article onto the article-receiving section of said platform means, a first gate between said inlet conveyor and the article-receiving section of the platform and which in a raised position prevents movement of the article onto said article receiving section of the platform means and in a lowered position allows such movement, said article-discharging section of the platform having a discharge edge portion at the level of the open article-receiving side of a carrier passing thereby, said inlet conveyor automatically moving an article against said first gate, said platform including article impelling means having a first condition where the article on said article-receiving section of the platform is impelled at an angle toward and beyond said discharge edge portion of the article-discharging section of the platform and at a velocity where the component of movement of the article longitudinally of the conveyor system has the same direction and about the same velocity as that of the carriers moving past the loading station, whereby the article involved is impelled onto a carrier with little or no shock, said article impelling means having a second condition where the article on said platform remains stationary, a second gate which in a raised position prevents movement of an article onto said conveyor system and in a lowered position allows such movement, and control means responsive to movement of a carrier into a given position in the vicinity of said loading station for momentarily operating said article impelling means into said first condition and for lowering said second gate to effect loading of an article onto said carrier, first article position sensing means for sensing the movement of an article from said platform means onto a carrier at said loading station by raising said second gate and lowering said first gate to allow a new article to move onto said platform means, and second article position sensing means responsive to the movement of the new article onto said platform means for raising said first gate.

5. A conveyor and loading system comprising: in combination, a series of longitudinally spaced article carriers each including a carrier body having a bottom wall terminating in unobstructed side margins which enable an article to be slid on or off either side of the carrier body, means for moving said carriers along an endless path passing by at least one article loading station, and means for loading an article onto an empty carrier at said loading station comprising first means in the path of movement of a carrier body passing by said loading station for tilting the same away from said loading station where the bottom wall thereof adjacent the loading station inclines downwardly and away therefrom and for then uprighting the same as it leaves the area of the loading station, and backup wall means opposite said loading station extending for the length encompassed by a tilted carrier body for preventing an article loaded from one side of the tilted carrier at the loading station from slipping off the other side of the carrier, and a platform at said loading station for supporting an article to be loaded onto the carrier, said platform having a discharge end portion facing, and at or above the level of, the bottom wall of a carrier moving by the loading station.

6. A conveyor and loading system comprising: in combination, a series of longitudinally spaced article carriers each including a tiltable carrier body having a trough-shaped bottom wall terminating in unobstructed side margins which enable an article to be slid on or off either side of the carrier body tilted laterally one side or the other, means for continuously moving said carriers along an endless path passing by at least one article loading station, and means for automatically loading articles onto an empty carrier moving past said loading station comprising first means in the path of movement of a carrier body passing by said loading station for tilting the same away from said loading station where the bottom wall thereof adjacent the loading station inclines downwardly and away therefrom and for then uprighting the same as it leaves the area of the loading station, and backup wall means opposite said loading station extending for the length encompassed by a tilted carrier body for preventing an article loaded from one side of the tilted carrier at the loading station from slipping off the other side of the carrier, a platform at said loading station for supporting an article to be loaded onto carrier, said platform having a discharge end portion facing the bottom wall of a tilted carrier moving by the loading station, said platform including article impelling means which, in response to a carrier loading signal indicating the movement of an empty carrier body opposite said loading station, momentarily impels an article on the platform to and beyond the discharge end portion of the platform at an angle which provides a velocity component parallel to the moving carrier units which is similar to and in the same direction as the velocity of the carrier units moving past the loading station, wherein the articles involved are impelled onto an empty carrier with little or no shock, and means responsive to the movement of an empty carrier adjacent said loading station for generating said carrier loading signal to effect loading of an article automatically onto an empty carrier moving past the loading station.

7. In a loading and conveyor system including individual carrier units, means for moving the carrier units in succession in an endless path past at least one loading station and a number of discharge stations, the carrier units approaching the loading station being sometimes filled and sometimes empty, each of the carrier units having means for receiving information which identifies the discharge station at which the article on the carrier unit is to be discharged, erasing means positioned ahead of said loading station for erasing the information on the information receiving means of the carrier unit approaching the loading station when energized, and recording means adjacent said loading station for recording new information on the information receiving means of a carrier unit at the loading station when energized, the improvement comprising loading means for automatically loading an article onto an empty carrier unit at said loading station, said loading means including impelling means for impelling an article onto a carrier unit at said loading station when energized, and control means for controlling the energization of said impelling means, erasing means and recording means, said control means comprising condition sensor means located behind the erasing means, memory means for storing information on the full and empty conditions of the carrier units between and including said loading station and said carrier condition sensor means, said carrier condition sensor means being responsive to the full and empty conditions of the carrier units passing thereby by storing information in the memory means on the full and empty conditions thereof, means responsive to the information stored in said memory means indicating that the carrier unit opposite said loading station is an empty carrier unit for energizing said impelling means and said recording means, and means responsive to the information stored in the memory means indicating that the carrier unit opposite said erasing means is an empty carrier unit for energizing said erasing means.

8. In a loading and conveyor system including individual carrier units, means for moving the carrier units in succession in an endless path past at least one loading station and a number of discharge stations, the carrier units approaching the loading station being sometimes filled and sometimes empty, each of the carrier units having means for receiving information which identifies the discharge station at which the article on the carrier unit is to be discharged, recording control means to be operated by an operator for recording said information on said information receiving means of a carrier unit opposite said loading station, erasing means positioned ahead of said loading station for erasing the information on the information receiving means of the carrier unit approaching the loading station when energized, and recording means adjacent said loading station for recording new information on the information receiving means of a carrier unit at the loading station when energized, the improvement comprising loading means for automatically loading an article onto an empty carrier unit at said loading station, said loading means including impelling means for impelling an article onto a carrier unit at said loading station when energized, and control means for controlling the energization of said impelling means, erasing means and recording means, said control means comprising condition sensor means located behind the erasing means, memory means for storing information on the full and empty conditions of the carrier units between and including said loading station and said carrier condition sensor means, said carrier conditions sensor means being responsive to the full and empty conditions of the carrier units passing thereby by storing information in the memory means on the full and empty conditions thereof, means responsive to the information stored in said memory means indicating that the carrier unit opposite said loading station is an empty carrier and to operation of said control means by the operator for energizing said impelling means and said recording means and means responsive to the information stored in the memory means indicating that the carrier unit opposite said erasing means is an empty carrier unit for energizing said erasing means.

References Cited by the Examiner

UNITED STATES PATENTS

| | | | |
|---|---|---|---|
| 2,923,420 | 2/1960 | Dyer | 214—11 |
| 3,166,181 | 1/1965 | Rutkus | 198—20 X |
| 3,189,155 | 6/1965 | Everman | 198—25 |
| 3,212,623 | 10/1965 | Griffith | 198—38 |

EVON C. BLUNK, *Primary Examiner.*

EDWARD A. SROKA, *Examiner.*